(12) United States Patent
Chen

(10) Patent No.: US 10,999,634 B2
(45) Date of Patent: May 4, 2021

(54) MEDIA CONTENT RECOMMENDATION METHOD, SERVER, CLIENT, AND STORAGE MEDIUM

(71) Applicant: TENCENT TECHNOLOGY (SHENZHEN) COMPANY LIMITED, Shenzhen (CN)

(72) Inventor: Zi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 166 days.

(21) Appl. No.: 16/367,025

(22) Filed: Mar. 27, 2019

(65) Prior Publication Data

US 2019/0222899 A1 Jul. 18, 2019

Related U.S. Application Data

(63) Continuation of application No. PCT/CN2018/083173, filed on Apr. 16, 2018.

(30) Foreign Application Priority Data

Apr. 21, 2017 (CN) .......................... 201710264671.2

(51) Int. Cl.
*H04N 21/466* (2011.01)
*H04N 21/482* (2011.01)
(Continued)

(52) U.S. Cl.
CPC ....... *H04N 21/4668* (2013.01); *G06F 16/735* (2019.01); *H04N 21/251* (2013.01);
(Continued)

(58) Field of Classification Search
None
See application file for complete search history.

(56) References Cited

U.S. PATENT DOCUMENTS 7,668,821 B1 * 2/2010 Donsbach ........... G06F 16/9535
707/765
8,644,688 B2 * 2/2014 Fishman .................. H04N 5/45
386/299

(Continued)

FOREIGN PATENT DOCUMENTS

CN 103997507 A 8/2014
CN 104079960 A 10/2014
(Continued)

OTHER PUBLICATIONS

The World Intellectual Property Organization (WIPO) International Search Report for PCT/CN2018/083173 dated Jul. 5, 2018 5 Pages (including translation).

(Continued)

*Primary Examiner* — Alexander Q Huerta
(74) *Attorney, Agent, or Firm* — Anova Law Group, PLLC

(57) ABSTRACT

This application discloses a media content recommendation method. The method includes the steps of receiving historical data of access to media content by a user or media content data followed by the user; determining an interest tag of the user according to the historical data or the followed media content data; and determining a recommended user group for the user according to the interest tag, and sending an identifier of the recommended user group to a client for presentation. The method further includes the steps of receiving an access request that carries the identifier of the recommended user group and that is sent by the client; determining, according to the identifier of the recommended user group, media content recommendation information provided by each user in the recommended user group; and pushing, to the client, the media content recommendation (Continued)

information provided by each user in the recommended user group.

20 Claims, 10 Drawing Sheets

(51) Int. Cl.
    *H04N 21/258*     (2011.01)
    *G06F 16/735*     (2019.01)
    *H04N 21/25*     (2011.01)

(52) U.S. Cl.
    CPC ... *H04N 21/25891* (2013.01); *H04N 21/4662* (2013.01); *H04N 21/4667* (2013.01); *H04N 21/4826* (2013.01)

(56) References Cited

U.S. PATENT DOCUMENTS

| | | | |
|---|---|---|---|
| 9,396,195 B1* | 7/2016 | Beguelin | H04N 21/4826 |
| 9,900,659 B1* | 2/2018 | Norum | H04N 21/442 |
| 2007/0204287 A1* | 8/2007 | Conradt | H04N 21/252 |
| | | | 725/28 |
| 2008/0077574 A1 | 3/2008 | Gross | |
| 2009/0150786 A1 | 6/2009 | Brown | |
| 2009/0178081 A1* | 7/2009 | Goldenberg | H04N 21/44222 |
| | | | 725/46 |
| 2013/0013626 A1* | 1/2013 | Svendsen | H04L 67/22 |
| | | | 707/758 |
| 2013/0167168 A1* | 6/2013 | Ellis | H04N 21/25891 |
| | | | 725/12 |
| 2013/0231996 A1* | 9/2013 | Chirita | H04L 67/306 |
| | | | 705/14.31 |
| 2015/0379648 A1* | 12/2015 | Spiegel | G06F 16/24 |
| | | | 705/319 |
| 2016/0021179 A1* | 1/2016 | James | G06Q 10/10 |
| | | | 709/204 |
| 2016/0286277 A1 | 9/2016 | Yin | |
| 2017/0238056 A1* | 8/2017 | Greene | G06F 16/4387 |
| | | | 725/131 |
| 2019/0286673 A1* | 9/2019 | Sayyadi-Harikandehei | |
| | | | G06F 7/026 |

FOREIGN PATENT DOCUMENTS

| | | |
|---|---|---|
| CN | 104123315 A | 10/2014 |
| CN | 104239450 A | 12/2014 |
| CN | 105303397 A | 2/2016 |
| CN | 106055617 A | 10/2016 |
| CN | 106157150 A | 11/2016 |
| CN | 107087235 A | 8/2017 |

OTHER PUBLICATIONS

The State Intellectual Property Office of the People's Republic of China (SIPO) office Action 1 for 201710264671.2 dated Oct. 30, 2020 11 Pages (including translation).

* cited by examiner

MEDIA CONTENT RECOMMENDATION METHOD, SERVER, CLIENT, AND STORAGE MEDIUM

RELATED APPLICATIONS

This application claims priority to PCT Application No. PCT/CN2018/083173, filed on Apr. 16, 2018, which in turn claims priority to Chinese Patent Application No. 201710264671.2, entitled "MEDIA CONTENT RECOMMENDATION METHOD, SERVER, AND CLIENT" filed with the Chinese Patent Office on Apr. 21, 2017. The two applications are incorporated herein by reference in their entirety.

FIELD OF TECHNOLOGY

This application relates to the field of Internet technologies, and in particular, to a media content recommendation method, a server, a client, and a storage medium.

BACKGROUND OF THE DISCLOSURE

Social networking means that interpersonal relationships are networked. Individuals take part in social networking activities on social networking service platforms. With the emergence of various social networking service websites and applications, social networking booms and creates a new mode for interpersonal communication. According to current popular social networking models, users may communicate according to user relationships formed based on a friend chain, a friend circle, or the like. There are an increasing number of circles in this era, from larger circles such as business circles, entertainment circles, and cultural circles to smaller circles such as backpacker circles, rock and roll circles, and food circles. It is more important for users having same interests to exchange information in a same circle.

SUMMARY

An embodiment of the present disclosure provides a media content recommendation method, applied to a media content server. The method includes the steps of receiving historical data of access to media content by a user or media content data followed by the user; determining an interest tag of the user according to the historical data or the followed media content data; and determining a recommended user group for the user according to the interest tag, and sending an identifier of the recommended user group to a client for presentation. The method further includes the steps of receiving an access request that carries the identifier of the recommended user group and that is sent by the client; determining, according to the identifier of the recommended user group, media content recommendation information provided by each user in the recommended user group; and pushing, to the client, the media content recommendation information provided by each user in the recommended user group.

An embodiment of the present disclosure further provides a media content recommendation method, applied to a client device. The method includes sending, to a media content server, historical data of access to media content by a user or media content data followed by the user, the media content server determining a recommended user group for the user; receiving and presenting an identifier of the recommended user group sent by the media content server; and sending, in response to an operation on the presented identifier of the recommended user group, an access request carrying the identifier of the recommended user group to the media content server. The method further includes receiving media content recommendation information pushed by the media content server and provided by each user in the recommended user group corresponding to the identifier of the recommended user group; and presenting the received media content recommendation information.

An instance of this application further provides a media content server, including a processor and a memory connected to the processor. The processor is configured to receive historical data of access to media content by a user or media content data followed by the user; determine an interest tag of the user according to the historical data or the followed media content data; determine a recommended user group for the user according to the interest tag, and send an identifier of the recommended user group to a client for presentation. The processor is also configured to receive an access request that carries the identifier of the recommended user group and that is sent by the client; determine, according to the identifier of the recommended user group, media content recommendation information provided by each user in the recommended user group; and push, to the client, the media content recommendation information provided by each user in the recommended user group.

One embodiment of this application further provides a client, including a processor and a memory connected to the processor, the memory storing a machine readable instruction unit. The machine readable instruction unit includes a data sending unit, configured to send, to a media content server, historical data of access to media content by a user and/or media content data followed by the user, the media content server determining a recommended user group for the user; a recommended user group identifier receiving unit, configured to receive and present an identifier of the recommended user group sent by the media content server; an access request sending unit, configured to send, in response to an operation on the presented identifier of the recommended user group, an access request carrying the identifier of the recommended user group to the media content server; a recommendation information receiving unit, configured to receive media content recommendation information pushed by the media content server and provided by each user in the recommended user group corresponding to the identifier of the recommended user group; and a recommendation information presentation unit, configured to present the received media content recommendation information.

An embodiment of this application further provides a non-volatile computer readable storage medium, storing a machine readable instruction, the machine readable instruction being executable by a processor to implement the foregoing method.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments in the present disclosure without creative effects shall fall within the protection scope of the embodiments of the present disclosure.

Figure 1:
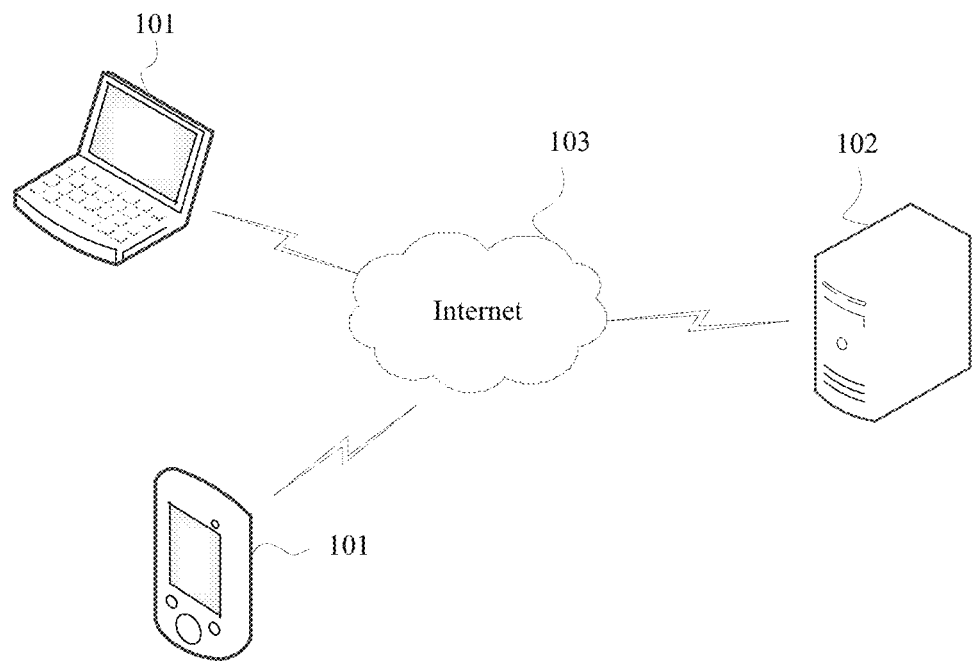
FIG. 1 is a diagram of a system architecture according to one embodiment of this application.

This application provides a media content recommendation method, a server, and a client. A system architecture used in this application is shown in FIG. 1. The system architecture includes: a client device 101, a media content server 102, and the Internet 103. The client device 101 and the media content server 102 are connected by using the Internet 103.

The client device 101 may be a smartphone or a computer of a user on which various application software clients are installed. The user may log in to the various application software clients by using the client device 101 and use the various application software clients. The application software clients may be a multimedia software client such as a video client. The Internet 103 may include a wired network and a wireless network.

It has become increasingly important for users having same interests to exchange information in a same circle. Currently, some media content clients have a social software-based friend circle. Users in the friend circle are users in a social chain, and neither can a user easily find a user having same interests and hobbies as those of the user nor find recommendation of a favored type of the user. In the following description, a user group is indicated by using a circle and refers to a group of people connected through same hobbies and interests. For example, for film watching, the circle is a user set including users having similar favored film types. The circle may include a science fiction circle, a drama circle, a suspense circle, and the like.

In the present disclosure a circle, a user circle, a group, and a user group are used interchangeably to refer to a plurality of users sharing one or more common traits. Such common traits may reflect user's demographics, interests, on-line behaviors, or any other characteristics. In some embodiment, such user groups and user circles are established and operated through links on social networking accounts, or other online accounts, such as email accounts.

Figure 2:
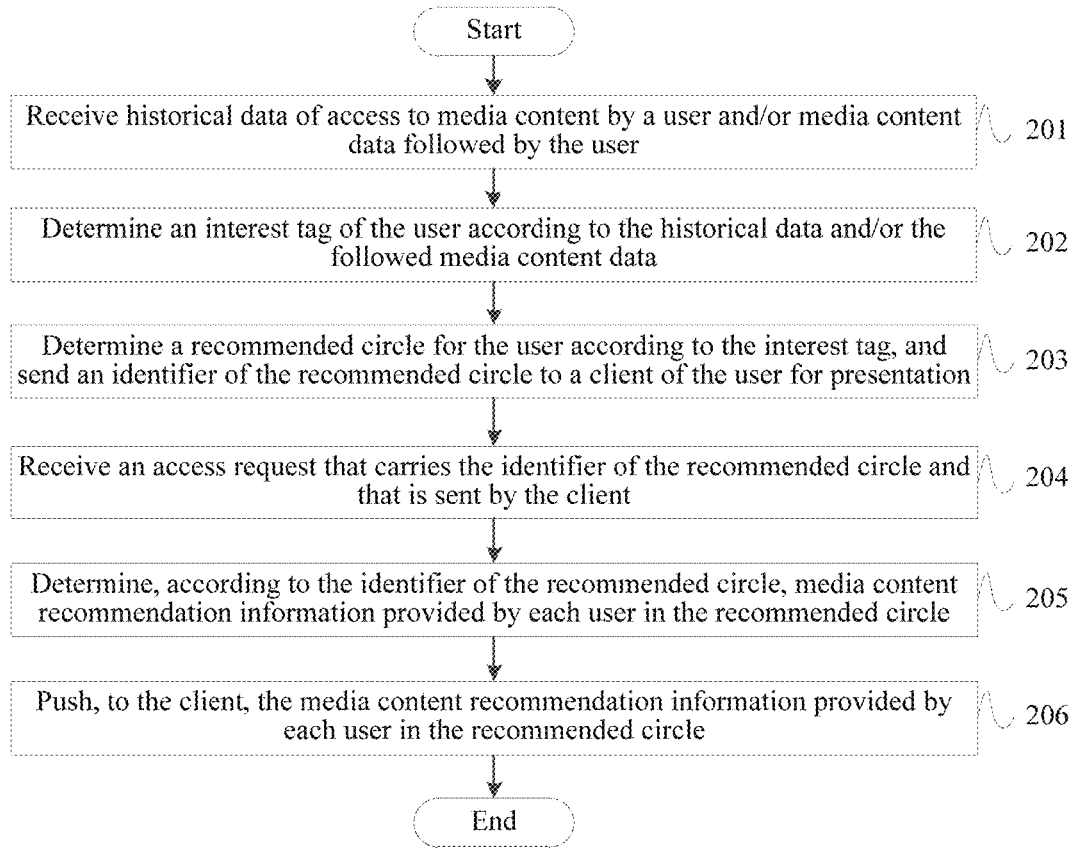
FIG. 2 is a flowchart of a media content recommendation method applied to a media content server according to one embodiment of this application.

This application provides a media content recommendation method. The method may be applied to the media content server 102. As shown in FIG. 2, the method includes the following steps.

Step 201: Receive historical data of access to media content by a user and/or media content data followed by the user.

The client device 101 uploads, at scheduled time, the historical data of access to media content by the user and/or the followed media content to the media content server. When the media content accessed by the user is a video, the corresponding client is a video APP and the corresponding media content server 102 is a video server. The video APP uploads, at scheduled time, a film watched by the user and a film followed by the user to the video server. The film followed by the user may be a film added to favorites by the user to facilitate searching and watching by the user.

Step 202: Determine an interest tag of the user according to the historical data and/or the followed media content data.

The interest tag of the user is determined according to tags of the accessed and followed media content of the user. For example, for videos, many videos are provided with a tag currently. For example, a tag of the film Gone with the Wind may include: classic novel, Europe and America, hero and heroine (Clark Gable and Vivien Leigh), drama, war, love, and the like. The interest tag of the user is obtained by collecting statistics on and analyzing tags carried in the watched and followed films of the user. For example, when the films watched by the user are mostly films starred by Kung Fu superstars such as Bruce Lee, Jason Wu, and Donnie Yen, the interest tag of the user is set to be action film.

Step 203: Determine a recommended circle for the user according to the interest tag, and send an identifier of the recommended circle to a client of the user for presentation.

Figure 3:
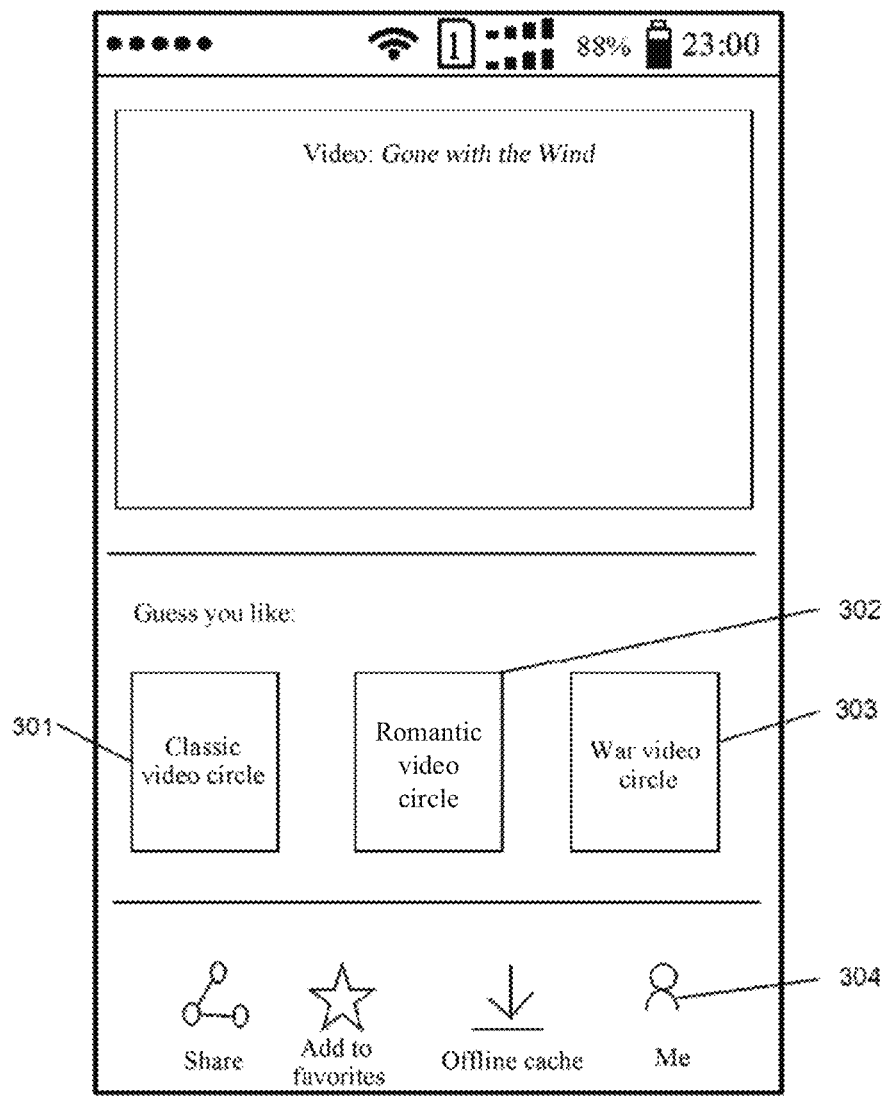
FIG. 3 is a schematic diagram of a page of a recommended user group according to one embodiment of this application.

A circle matching the interest tag of the user is recommended to the user according to the interest tag of the user. For example, if films often watched and followed by the user are science fiction films or TV series (Jurassic World, Superman, The Avengers, Black Mirror, and the like), two types of circles, namely, an Europe and America film circle and a science fiction circle may be recommended to the user. The circle recommended to the user is sent to the client of the user for presentation. As shown in FIG. 3, when the user watches the film Gone with the Wind on the video APP, video circles recommended to the user according to the films watched by the user and the films followed by the user are presented below the film, for example, a classic video circle 301, a romantic video circle 302, and a war video circle 303.

Step 204: Receive an access request that carries the identifier of the recommended circle and that is sent by the client.

When the user clicks an identifier of a recommended circle on the client to access the recommended circle, an access request is sent to the media content server. The access request carries the identifier of the to-be-accessed recommended circle. The identifier of the recommended circle may be a name of the recommended circle, for example, the romantic video circle in FIG. 3.

Step 205: Determine, according to the identifier of the recommended circle, media content recommendation information provided by each user in the recommended circle.

The media content server determines the corresponding circle according to the identifier of the recommended circle, such as the name of the recommended circle, carried in the access request, obtains all users in the circle, and obtains media content recommendation information provided by each user. The media content recommendation information includes a name of recommended media content and a recommendation reason, and may further include a link of the recommended media content. For example, when the media content is a film, media content recommendation information includes a name of the recommended film and a recommendation reason, and may further include a poster and the like of the recommended film.

Step 206: Push, to the client, the media content recommendation information provided by each user in the recommended circle.

Figure 4:
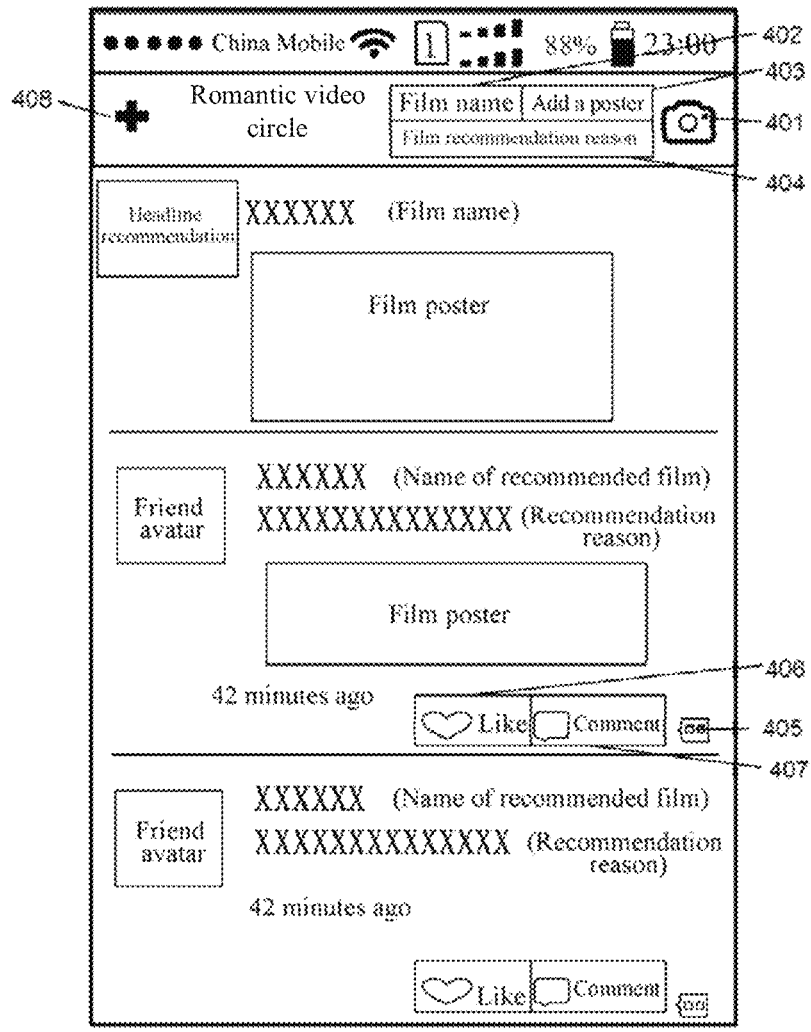
FIG. 4 is a schematic diagram of a page of a user group according to one embodiment of this application.

The media content server 102 sends the media content recommendation information provided by each user in the circle to the client of the user for presentation, that is, for presenting a post of the recommended circle. Still as shown in the foregoing instance, when the recommended circle, the romantic video circle 302, is clicked, a post of the romantic video circle in FIG. 4 is shown. The post of the circle includes a headline recommendation of the circle and film recommendation information provided by the users in the circle. The headline recommendation may be determined by the media content server 102, or may be determined by a circle owner of the circle. The circle owner is a user establishing the circle. The headline recommendation determined by the media content server 102 may be a latest film played in a theater, a film with a largest quantity of favorable comments from the users in the circle, and may alternatively be a latest film played on the video APP. When the headline recommendation is determined by the circle owner, the circle owner selects a film as the headline recommendation. The film recommendation information provided by each user in the circle mainly includes an avatar of the provider, a name of a recommended film, and may further include a poster of and a recommendation reason of the recommended film.

According to the media content recommendation method provided in this application, the interest tag of the user is determined according to the media content data accessed by the user and media content data followed by the user, to recommend the circle matching the interest tag of the user to the user, so that the user can view the media content recommendation information recommended by the users in the recommended circle. This helps the user find the media content in which the user is interested. In addition, it is easier for a media content provider to find a target user group, thereby improving a media content pushing effect.

In some instances, in step 202, the determining an interest tag of the user according to the historical data and/or the followed media content data may include that following steps:

1) Extract tags of the historical data and/or the followed media content data to form a tag set.

Tags of each media content in the historical data and/or the followed media content data are extracted and integrated, to form a tag set. The tag set includes a plurality of tags and a quantity of occurrence times of each tag in the historical data and/or the followed media content data. For example, for videos, if tags of five videos include ""love" among obtained historical video playback data and video data followed by the user, a quantity of occurrence times of the tag "love" in the tag set is five.

2) Collect statistics on a quantity of occurrence times of each tag in the tag set, and use one or more tags whose quantity of occurrence times are relatively many as interest tags of the user.

Statistics on the quantity of occurrence times of each tag in the tag set in the historical data and/or the followed media content data are collected, and the tags are sorted in descending order of quantities of occurrence times, and the first one or more tags are used as interest tags of the user. Still as shown in the foregoing instance, when a tag of the user having the largest quantity of occurrence times is "love", love film may be set as an interest tag of the user.

Figure 5:
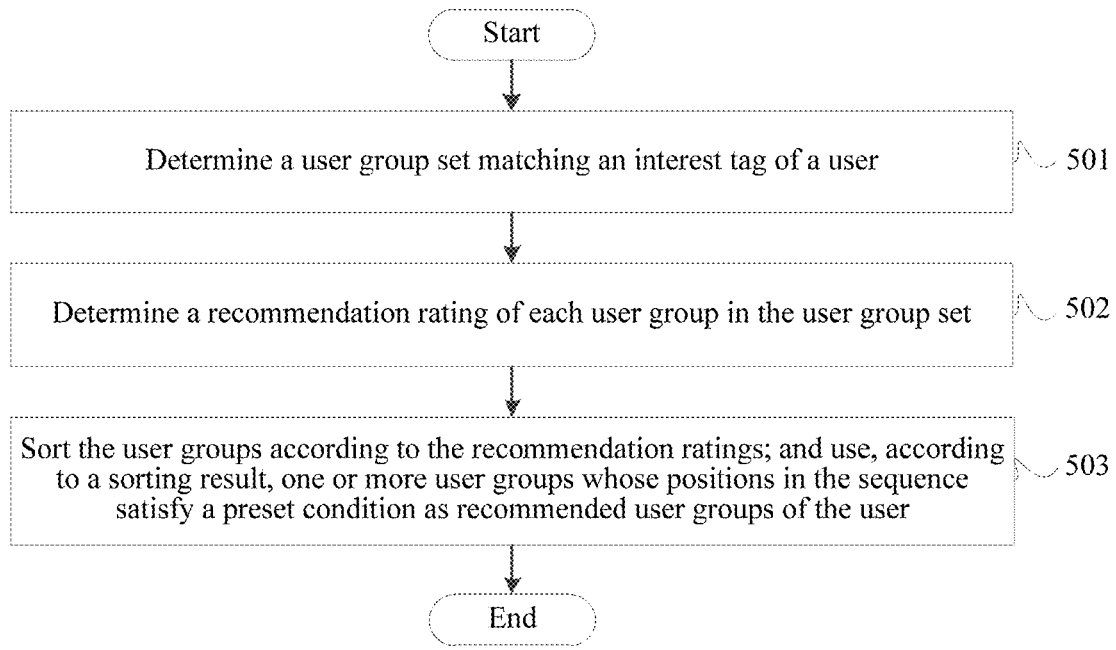
FIG. 5 is a flowchart of determining a recommended user group for a user according to one embodiment of this application.

In some instances, in step 203, the determining a recommended user group (the user group also being referred to as a circle) for the user according to the interest tag mainly includes the following steps, as shown in FIG. 5:

Step 501: Determine a user group set matching the interest tag of the user.

There may be a plurality of circles matching the interest tag of the user, and the circles may be circles established by the media content server 102, or may be circles established by a user having a circle owner permission.

Step 502: Determine a recommendation rating of each user group in the user group set.

The recommendation rating may be obtained according to a quantity of users in the circle and an accumulated level of each user in the circle. The level of the user is obtained according to a quantity of interactions such as likes and comments performed by the user on a client on media content recommendation information provided by another user. When the quantity of interactions satisfies a preset condition, the user reaches a specific level. To obtain a recommendation rating of a circle, weighted summation may be performed on the quantity of users and the accumulated level of each user in the circle. Weights of the quantity of users and the accumulated level may be obtained based on experience.

Step 503: Sort the user groups according to the recommendation ratings; and use, according to a sorting result, one or more user groups whose positions in the sequence satisfy a preset condition as recommended user groups of the user.

The circles in the circle set are sorted in descending order of the recommendation ratings of the circles calculated in the foregoing step, and the first one or more circles in the sequence are selected as recommended circles of the user.

In some instances, there are M recommended user groups, M being an integer greater than 1. The sending an identifier of the recommended user group to a client of the user for presentation includes: The media content server sends identifiers of the M recommended user groups and a sorting sequence of recommendation ratings of the M recommended user groups to the client of the user, so that the client presents the identifiers of the M recommended user groups according to the sorting sequence.

In some instances, in step 206, the pushing, to the client, the media content recommendation information provided by each user in the recommended circle includes: sorting the media content recommendation information provided by each user in time sequence, that is, sorting the media content recommendation information according to recommendation time points. In this way, the user may find latest media content recommendation information provided by another user in the circle. Specifically, First, the media content recommendation information provided by each user is sorted according to the recommendation time points.

A user applying to joining a circle may recommend media content in the circle. For example, for video recommendation, in FIG. 4, an input box 402 for entering a name of a recommended film, an option box 403 for adding a poster of the recommended film to the recommendation information, and an input box 404 for entering a recommendation reason are displayed when a recommendation option 401 is clicked. The user enters the name of the recommended film in the input box 402, selects whether to carry the poster of the film in the recommendation information by operating the option box 403, enters the recommendation reason of the film in the input box 404, clicks a sending option to send the video recommendation information, and sends a recommendation request to the media content server 102. The recommendation request includes the name and the recommendation reason of the recommended video. When the user uploads the poster of the recommended media content by using the option 403, the recommendation information further carries an identifier of the poster. In addition, when the user clicks the sending option, the video APP records the sending time point, and sends the recorded time point to the media content server when sending the recommendation request to the media content server 102.

Then, the media content server 102 sends the media content recommendation information provided by each user and a sorting sequence of the recommendation time points of the media content recommendation information to the client of the user, so that the client presents the media content recommendation information provided by each user according to the sorting sequence.

Figure 6:
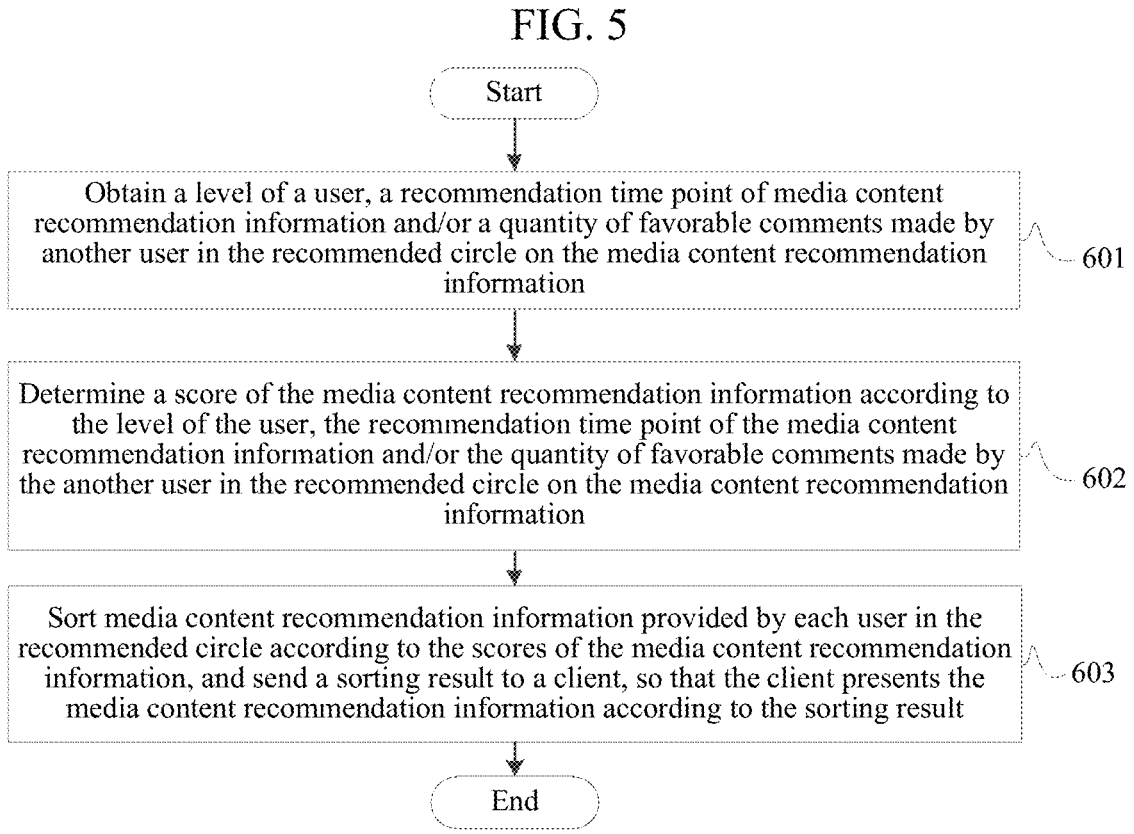
FIG. 6 is a flowchart of presenting recommendation information in popularity sequence according to one embodiment of this application.

In some instances, in step 206, the pushing, to the client, the media content recommendation information provided by each user in the recommended circle includes: sorting the media content recommendation information provided by each user in the recommended circle according to popularity, that is, scoring the media content recommendation information provided by each user according to some dimensions, and presenting the media content recommendation information in a sorting sequence of scores of the media content recommendation information. Specifically, as shown in FIG. 6, the following steps are included:

The following steps are performed on media content recommendation information provided by a user in the recommended circle:

Step 601: Obtain a level of the user, a recommendation time point of the media content recommendation information and/or a quantity of favorable comments made by another user in the recommended circle on the media content recommendation information.

When interaction data of the user on media content recommendation information satisfies a preset condition, the user reaches a specific level. For example, when a quantity of interactions such as likes and comments performed by the user on media content recommendation information exceeds a preset threshold, the user reaches a specific level. The user levels of the providers of the media content recommendation information are obtained. In addition, the recommendation time points of the media content recommendation information and/or a quantity of favorable comments made by another user on each media content recommendation information are obtained.

Step 602: Determine a score of the media content recommendation information according to the level of the user, the recommendation time point of the media content recommendation information and/or the quantity of favorable comments made by another user in the recommended circle on the media content recommendation information.

Any of the media content recommendation information provided by each user in the circle is scored according to the level of the recommender user, the recommendation time point and/or the quantity of favorable comments of the media content recommendation information that are obtained in step 602. Preferably, weighted summation may be performed on the foregoing items to determine the score of the media content recommendation information.

Step 603: Sort the media content recommendation information provided by each user in the recommended circle according to the scores of the media content recommendation information, and send a sorting result to the client, so that the client presents the media content recommendation information according to the sorting result.

The media content recommendation information provided by each user in the circle is sorted according to the scores of the media content recommendation information, and the obtained sorting result is sent to the client of each user in the circle, so that the client presents the media content recommendation information according to the sorting result.

In some instances, the media content recommendation method provided in this application further includes determining headline media content recommendation information in the circle. The headline media content recommendation information in the circle may be determined by the media content server 102, or may be determined by the circle owner of the circle. When the headline media content recommendation information is determined by the media content server 102, the following steps are mainly included:

1) Determine headline media content recommendation information of the recommended user group.

The media content server 102 determines headline media content recommendation information of a circle. For example, for film recommendation, the headline recommendation may be a latest film played in a theater, a film with a largest quantity of favorable comments from the users in the circle, and may alternatively be a latest film played on the video APP. The headline media content recommendation information may further include a link of the recommended film, for example, a poster of the recommended film.

2) Send the headline media content recommendation information to a client of each user in the recommended user group, so that each client presents the headline media content recommendation information at a specified position on a page of the recommended user group.

The foregoing obtained headline recommendation is send to the client of each user in the circle, so that the client displays the headline media content recommendation information at the specified position on the page. The specified position may be a top on the page.

In some instances, the media content recommendation method provided in this application further includes receiving an application from a user of joining a circle. This specifically includes the following steps:

1) Receive a circle join request sent by the client and carrying an identifier of the user and the identifier of the recommended circle.

In FIG. 3, for video recommendation, the page of the romantic video circle in FIG. 4 is entered when an identifier of the romantic video circle 302 is clicked. A circle join option 408 and the recommendation information provided by each user in the circle are displayed on the page. When the user operates the circle join option 408, the video APP used by the user sends a circle join request to the media content server. The circle join request includes the identifier of the user and the identifier of the recommended circle that is applied to be joined.

2) Add the identifier of the user to the recommended user group in response to the circle join request.

The media content server 102 adds the user to the circle corresponding to the identifier of the recommended circle in the request after receiving the circle join request. The user can view a post of the circle without joining the circle, and can perform interaction such as like and comment in the circle and recommend media content both only after joining the circle.

In some instances, the user can, after joining the circle, interact with the media content recommendation information provided by another user in the circle in the post of the circle. This mainly includes the following steps: receiving an interaction request sent by the client for one of the media content recommendation information provided by each user in the recommended user group, the interaction request including an identifier and interaction content of the media content recommendation information, and sending the interaction content and the identifier of the media content recommendation information to a client of each user in the user group, so that each client presents the interaction content at a position of the media content recommendation information corresponding to the identifier of the media content recommendation information.

The media content server 102 receives an interaction request sent by a client of a user in the circle. For example, for video recommendation, in the diagram of a post of the romantic video circle in FIG. 4, specific interaction options such as a like option 406 and a comment option 407 occur when the users clicks an interaction option 405. In response to an operation of the user, the client sends an interaction request to the media content server 102. The interaction request includes an identifier and interaction content of media content recommendation information that is interacted with. The interaction content includes an identifier of the user, an identifier of an interaction type and/or text content. Still for the video recommendation in FIG. 4, when a user clicks the like option 406, an interaction request includes an identifier and interaction content of liked recommendation information. The interaction content includes an identifier of the user performing the liking. The media content server 102 sends the interaction content to the client of each user in the circle, so that the client presents the interaction content at a position of the recommendation information corresponding to the identifier of the liked recommendation information. Each client presents the like interaction at the position of the recommendation information corresponding to the identifier of the liked recommendation information, that is, presents the like posted by the user corresponding to the identifier of the user performing the liking on the media content recommendation information. When a user clicks the comment option 407, a comment input box and a sending option are presented. The user enters text content, that is, comment content, in the comment input box and clicks the sending option. The client video APP sends an interaction request to the media content server 102. The interaction request includes an identifier and interaction content of commented recommendation information. The interaction content includes an identifier of the user making the comment and the comment content entered by the user. After receiving the interaction request, the media content server 102 sends the interaction content corresponding to the interaction request to the client of each user in the circle, so that each client presents the interaction content (including the comment content and the identifier of the user making the comment) at a position of the recommendation information corresponding to the identifier of the commented recommendation information. The client video APP presents the interaction content at the position of the recommendation information corresponding to the identifier of the commented recommendation information, that is, presents the comment content of the user corresponding to the identifier of the user making the comment.

Figure 7:
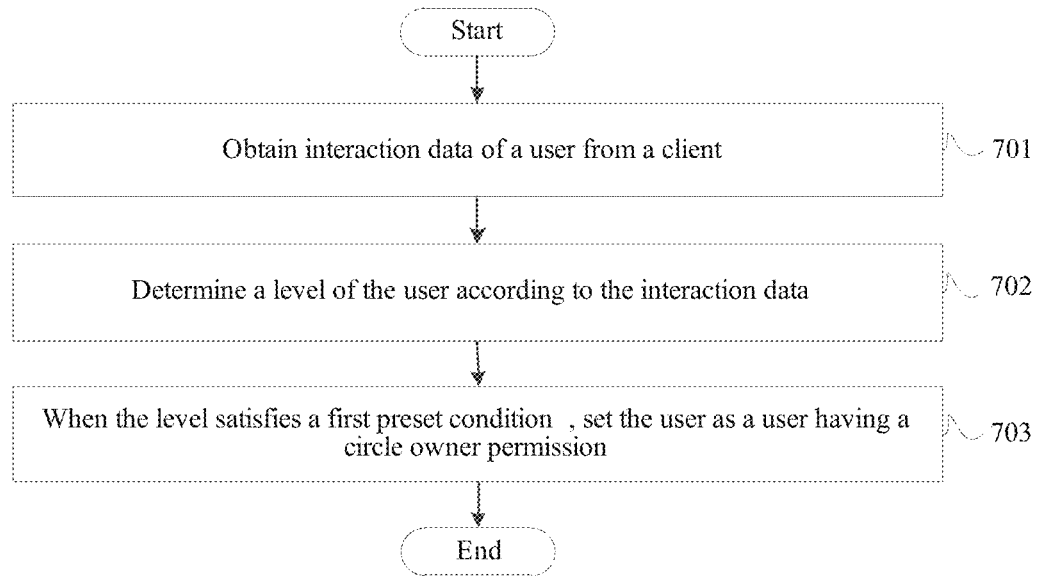
FIG. 7 is a flowchart of setting a circle owner according to one embodiment of this application.

In some instances, the media content recommendation method provided in this application further includes setting a circle owner permission for a user when the user reaches a specific level. Specifically, as shown in FIG. 7, this mainly includes the following steps:

Step 701: Obtain interaction data of the user from the client.

The media content server 102 obtains the interaction data of the user from the client of the user. The interaction data mainly includes interaction data such as likes and comments of the user on another user. The user may have joined a plurality of circles. In this case, the interaction data of the user includes interaction data of the user on recommendation information of another user in each of the circles joined by the circle. The interaction data of the user reflects activeness of the user.

Step 702: Determine a level of the user according to the interaction data.

The interaction data of the user reflects the activeness of the user, and the level of the user is determined according to the interaction data of the user. Each level has specific requirements, for example, requirements on quantities of likes and comments. When the quantities of likes and comments in the interaction data of the user reach a requirement of a specific level, the user reaches this level.

Step 703: When the level satisfies a first preset condition, set the user as a user having a circle owner permission.

The media content server 102 sets a circle owner permission for a user reaching a specific level. For example, when the level of the user reaches a third level, the user is set to be a user having the circle owner permission. The user having the circle owner permission can establish a circle and manage the established circle. This mainly includes selecting a headline recommendation for the circle, removing a user from the circle, forbidding a user in the circle to post, and the like. The forbidding a user in the circle to post means that the user is not allowed to interact with another user in the circle. The user is not allowed to like or comment, nor is allowed to recommend media content in the circle, that is, the user cannot provide media content recommendation information.

In some instances, the user having the circle owner permission establishes a circle mainly includes the following steps:

1) Receive a circle establishment request from the client, the circle establishment request carrying an identifier and a tag of a new circle.

Figure 8:
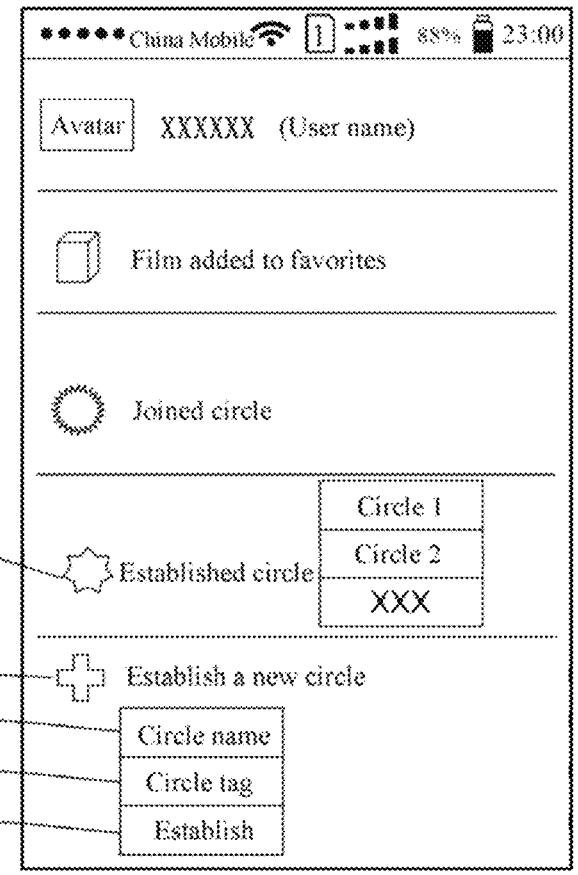
FIG. 8 is a schematic diagram of a home page of a user according to one embodiment of this application.

The user having the circle owner permission may establish a circle, and send a circle establishment request to the media content server when establishing the circle. The request includes an identifier and a tag of the new circle. The identifier may be a name of the circle. The tag of the new circle corresponds to main media content corresponding to the circle. In addition, the tag of the circle is further used for matching a tag of the circle with the interest tag of the user when the circle is recommended to the user. For example, for film recommendation, a user logs in to a video APP account to establish a new circle. As shown in FIG. 3, the user clicks a me option 304, so that a page in FIG. 8 is shown. The page in FIG. 8 displays an avatar and a name of the current user, as well as a film added to favorites of the current user, a circle joined by the current user, a circle established by the current user, and a circle establishment option. When the user clicks the circle establishment option 801, a circle name input box 802, a circle tag input box 803 and an establishment option 804 are presented. After entering a name and a tag of a to-be-established circle, the user clicks the establishment option 804, and a client corresponding to the user sends a circle establishment request to the media content server. The request carries the name and the tag of a to-be-established circle entered by the user.

2) Establish the new circle according to the identifier and the tag of the new circle.

The media content server establishes the new circle according to the name and the tag of the to-be-established circle carried in the circle establishment request. The identifier of the new circle established by the user is presented in an established circle option 805 in FIG. 8. When the user clicks the established circle option 805, identifiers of all circles established by the user are presented.

In some instances, the user having the circle owner permission manages the circle established by the user mainly includes the following steps:

1) Receive a management request from the client, the management request carrying an identifier of a circle and to-be-processed identifiers of one or more users.

Figure 9:
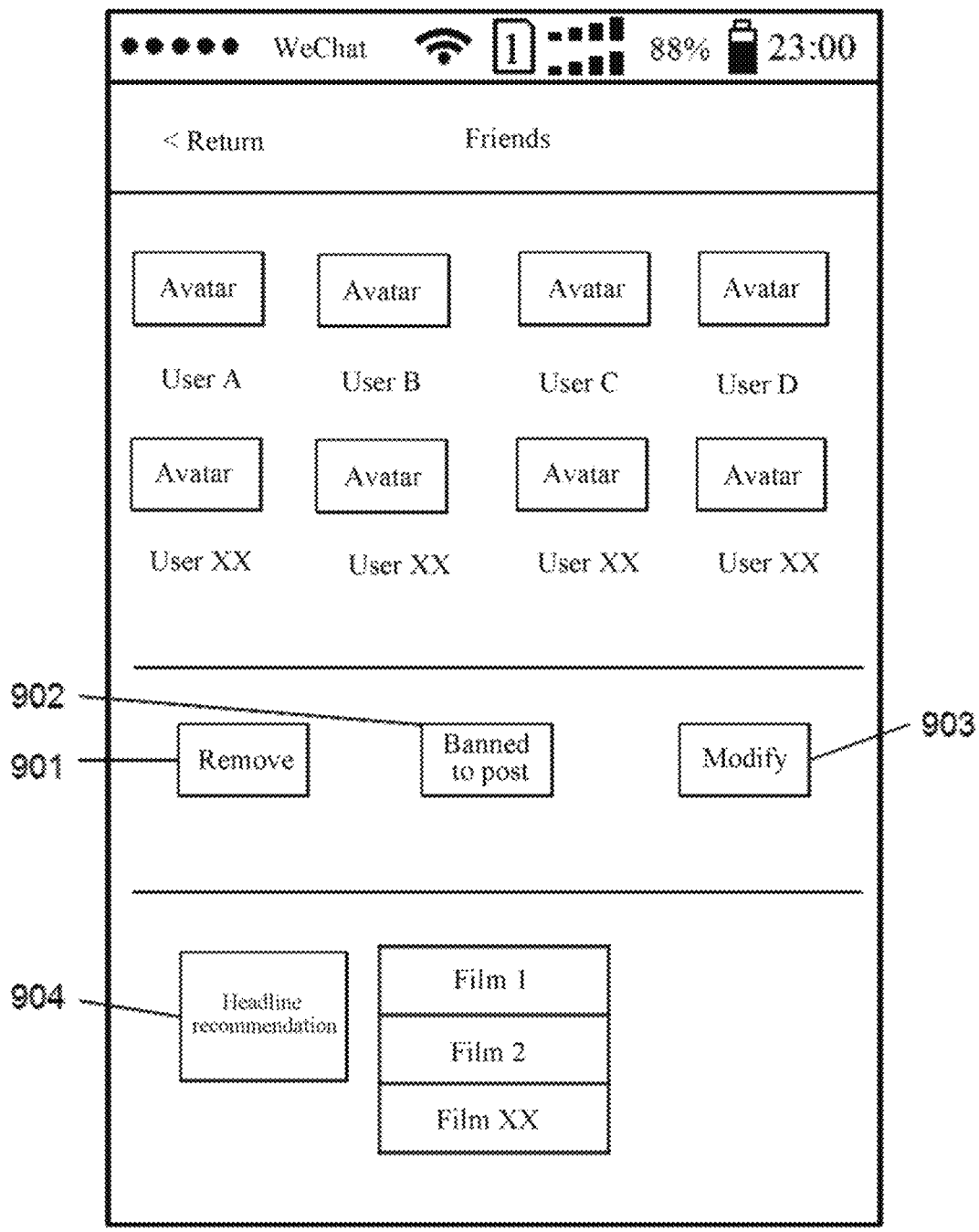
FIG. 9 is a schematic diagram of an interface of a user group according to one embodiment of this application.

Still using the video recommendation as an example, on the interface in FIG. 8, when the user clicks the established circle option 805, the client presents identifiers of all circles established by the user. When the user clicks an identifier of a circle, a circle interface in FIG. 9 is presented. Identifiers of all users in the circle are shown on the interface. The identifier of each user mainly includes an avatar and a name of the user. In addition, a deletion option 901, a banned to post option 902, and a modification option 903 are presented. The deletion option 901 is used for removing a selected user identifier from the circle. The banned to post option 902 is used for forbidding a user corresponding to the selected user identifier to like, comment or recommend a video in the circle. The modification option 903 may be used for, for example, modifying an alias of a user. When the user selects identifiers of one or more users as well as the deletion option 901, the banned to post option 902, or the modification option 903, the client sends a corresponding management request to the media content server. The management request carries the identifier of the circle and the to-be-processed identifiers of the one or more users.

2) Manage the identifiers of the one or more users in the user group corresponding to the identifier of the user group according to the management request.

The media content server 102 performs, according to the management request, an operation corresponding to the deletion option 901, the banned to post option 902, or the modification option 903 on the one or more users corresponding to the identifiers of the one or more users in the circle corresponding to the identifier of the circle in the management request.

In some instances, the user having the circle owner permission can determine headline recommendation in the circle established by the user mainly includes the following steps:

1) Receive headline media content recommendation information from the client, the headline media content recommendation information carrying an identifier of a user group.

The user having the circle owner permission determines the headline media content recommendation information of the circle established by the user, and sends the recommendation information to the media content server. The recommendation information carries the identifier of the circle. For video recommendation, when the user determines a headline recommendation of the circle established by the user, a headline recommendation option 904 is presented on an interface of the circle established by the user in FIG. 9. The user clicks the headline recommendation option 904 to present all films, and selects one film as the headline recommendation.

2) Send the headline media content recommendation information to a client of each user in the user group corresponding to the identifier of the user group, so that each client presents the headline media content recommendation information at a specified position on a page of the user group.

After receiving the headline recommendation information, the media content server 102 determines the circle corresponding to the identifier of the circle in the recommendation information, and sends the recommendation information to the client of each user in the determined circle for presentation. The recommendation information may be a poster of the selected film. The client may present the poster at a top position in FIG. 4.

Figure 10:
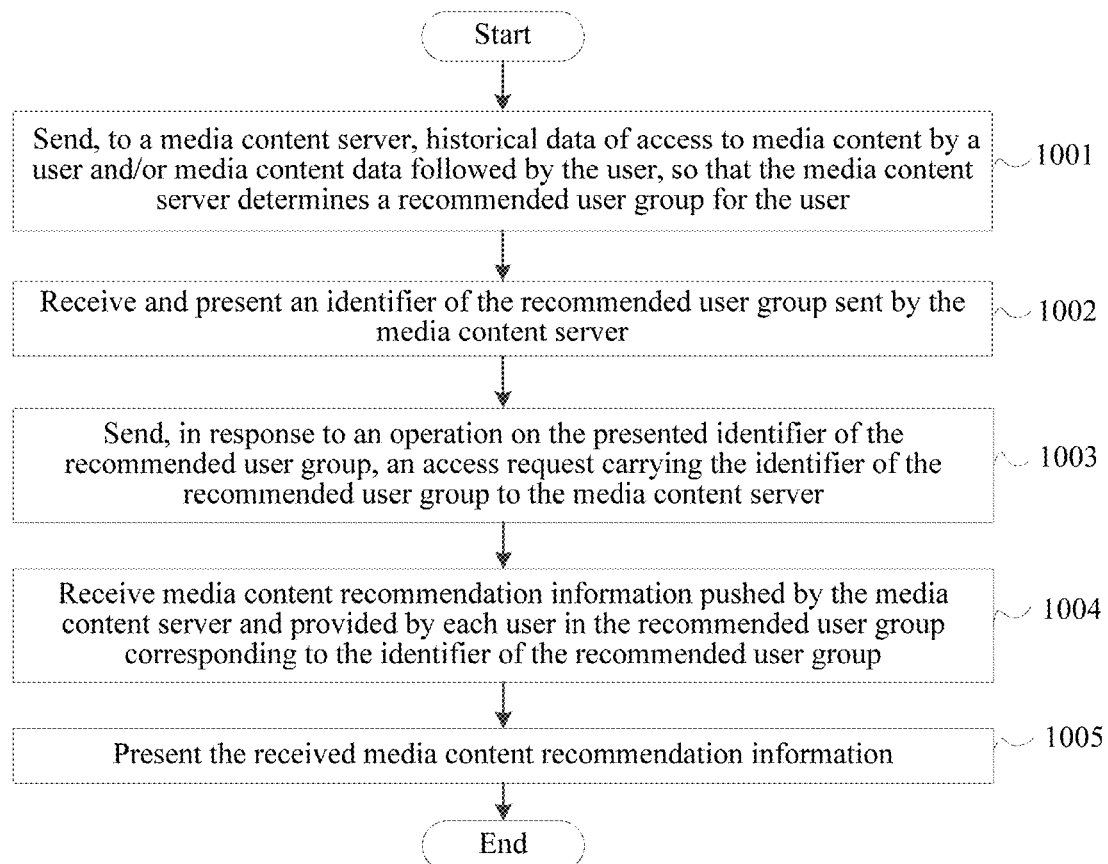
FIG. 10 is a flowchart of a media content recommendation method applied to a client according to one embodiment of this application.

This application further provides a media content recommendation method. The method may be applied to a client device 101. As shown in FIG. 10, the method mainly includes the following steps:

Step 1001: Send, to a media content server, historical data of access to media content by a user and/or media content data followed by the user, so that the media content server determines a recommended user group for the user.

The client device 101 uploads, at scheduled time, the historical data of access to media content by the user and the followed media content to the media content server. When the media content accessed by the user is a video, the corresponding client is a video APP and the corresponding media content server 102 is a video server. The video APP uploads, at scheduled time, a film watched by the user and a film followed by the user to the video server. The film followed by the user may be a film added to favorites by the user, that is, a film in FIG. 8 added to favorites by the user, to facilitate searching and watching by the user. The media content server determines a recommended circle for the user according to the historical data of accessed media content and/or the followed media content data.

Step 1002: Receive and present an identifier of the recommended user group sent by the media content server.

The media content server determines a recommended circle for the user according to the historical data of accessed media content and/or the followed media content data. For example, if films often watched and followed by the user are science fiction films or TV series (Jurassic World, Superman, The Avengers, Black Mirror, and the like), two types of circles, namely, an Europe and America film circle and a science fiction circle may be recommended to the user. The circle recommended to the user is sent to the client of the user for presentation. As shown in FIG. 3, when the user watches the film Gone with the Wind on the video APP, video circles recommended to the user according to the films watched by the user and the films followed by the user are presented below the film, for example, a classic video circle 301, a romantic video circle 302, and a war video circle 303.

Step 1003: Send, in response to an operation on the presented identifier of the recommended user group, an access request carrying the identifier of the recommended user group to the media content server.

When the users click an identifier of a recommended circle, for example, the identifier of the romantic video circle 302 in FIG. 3, on the client to access the recommended circle, an access request for the circle is sent to the media content server. The access request carries the identifier of the to-be-accessed recommended circle. The identifier of the recommended circle may be a name of the recommended circle.

Step 1004: Receive media content recommendation information pushed by the media content server and provided by each user in the recommended user group corresponding to the identifier of the recommended user group.

The media content server determines the corresponding circle according to the identifier of the recommended circle, such as the name of the recommended circle, carried in the access request, obtains all users in the circle, and obtains media content recommendation information provided by each user. The media content recommendation information includes a name of recommended media content and a recommendation reason, and may further include a link of the recommended media content. For example, when the media content is a film, media content recommendation information includes a name of the recommended film. The media content recommendation information may further include a recommendation reason and a poster and the like of the recommended film.

Step 1005: Present the received media content recommendation information.

The media content server sends the media content recommendation information provided by each user in the circle to the client of the user for presentation, that is, for presenting a post of the recommended circle. Still as shown in the foregoing instance, when the recommended circle, the romantic video circle, is clicked, a post of the romantic video circle in FIG. 4 is shown. The post of the circle includes a headline recommendation of the circle and film recommendation information provided by the users in the circle. The headline recommendation may be determined by the media content server, or may be determined by a circle owner of the circle. The headline recommendation determined by the media content server may be a latest film played in a theater, a film with a highest score from the users in the circle, and may alternatively be a latest film played on the video APP. When the headline recommendation of the circle is determined by the circle owner, the circle owner selects a film as the headline recommendation. The film recommendation information provided by each user in the circle mainly includes an avatar of the provider, a name of a recommended film, and may optionally, further include a poster of the recommended film.

According to the media content recommendation method provided in this application, an interest tag of the user is determined according to the accessed media content data and/or media content data followed by the user, to recommend a circle matching the interest tag of the user to the user, so that the user can view the media content recommendation information recommended by the users in the recommended circle. This helps the user find the media content in which the user is interested. In addition, it is easier for a media content provider to find a target user group, thereby improving a media content pushing effect.

In some instances, the media content recommendation method provided in this application further includes receiving a recommended circle join request from a user. This mainly includes the following steps:

1) In response to an operation on a presented identifier of one of recommended user groups, present a posted page of the recommended user group, a user group join option being presented on the posted page.

In FIG. 3, for video recommendation, when the identifier of the romantic video circle 302 is clicked, a detail page of the romantic video circle shown in FIG. 4 is entered. Media content recommendation information provided by each user in the recommended circle is displayed on the detail page. In addition, the circle join option 408 is presented.

2) In response to an operation on the circle join option, send a circle join request carrying an identifier of the user and the identifier of the recommended circle.

After the user operates the circle join option 408 in FIG. 4, the video APP used by the user sends a circle join request to the media content server. The circle join request includes the identifier of the user and an identifier of the recommended circle applied to be joined.

3) Receive an acknowledgment message sent by the media content server, the media content server sending the acknowledgment message after adding the identifier of the user to the recommended user group corresponding to the identifier of the recommended user group.

The media content server 102 adds the user to the circle corresponding to the identifier of the recommended circle in the request after receiving the circle join request, and sends an acknowledgment message to the client of the user. The user can view a post of the circle without joining the circle, and can perform interaction such as like and comment in the circle and recommend media content both only after joining the circle.

In some instances, the user can, after joining the circle, interact with the media content recommendation information provided by the another user in the circle in the post of the circle. This mainly includes the following steps:

1) Further present an interaction option corresponding to each media content recommendation information when presenting the media content recommendation information.

All circles joined by the user are stored in a joined circle option in FIG. 8. When the user clicks the joined circle option, all the circles joint by the user are presented. When the user selects a joined circle, for example, a romantic video circle, a diagram of a post of the romantic video circle in FIG. 4 occurs. The diagram of the post of the circle displays a headline recommendation of the circle and video recommendation information provided by each user in the circle. An interaction option 405 is presented below each video recommendation information. After the user clicks the interaction option 405, specific interaction options such as a like option 406 and a comment option 407 occur.

2) In response to an operation on an interaction option of any media content recommendation information, send an interaction request carrying an identifier and interaction content of the media content recommendation information to the media content server, the interaction request including the identifier of the user and an identifier of an interaction type.

In response to selection of an interaction option of any media content recommendation information by the user and/or reception of text content entered by the user, the client sends an interaction request to the media content server. The interaction request includes an identifier and interaction content of media content recommendation information that is interacted with. The interaction content includes an identifier of the user and/or an identifier of an interaction type and/or text content. Still for the video recommendation in FIG. 4, when a user clicks the like option 405, an interaction request includes an identifier and interaction content of liked recommendation information. The interaction content includes an identifier of the user performing the liking. When a user selects the comment option 407, a comment input box and a sending option are presented. The user enters text content, that is, comment content, in the comment input box and clicks the sending option. The client video APP sends an interaction request to the media content server 102. The interaction request includes an identifier and interaction content of commented recommendation information. The interaction content includes an identifier of the user making the comment and the comment content entered by the user.

3) When the user performs an operation on the identifier of the circle in which the user joins, to access the circle, receive the identifier and the interaction content of the media content recommendation information that are sent by the media content server, and display the interaction content at a position of the media content recommendation information corresponding to the identifier of the media content recommendation information.

In some instances, when making a comment, input text content is received, and the text content is added to the interaction content.

In some instances, the media content recommendation method provided in this application further includes the following steps: receiving interaction content, sent by the media content server, of one of the media content recommendation information provided by each user; and displaying the interaction content at a position of the media content recommendation information on a posted page of the recommended user group.

Still for the video recommendation in the foregoing instance, when the interaction is liking, the media content server 102 sends the like interaction to the client of each user in the circle for presentation. The client presents the like interaction at a position of the recommendation information corresponding to an identifier of the liked recommendation information, that is, presents the like posted by the user corresponding to the identifier of the user performing the liking on the media content recommendation information. When the interaction is comment, after receiving the interaction request, the media content server 102 sends the interaction content corresponding to the interaction request to the client of each user in the circle for presentation. The client video APP presents the comment at the position of the recommendation information corresponding to the identifier of the commented recommendation information, that is, presents the comment content of the user corresponding to the identifier of the user making the comment.

In some instances, after the user reaches a specific level, the media content server 102 sets a circle owner permission for the user. This mainly includes the following steps.

1) Send interaction data of the user to the media content server.

The interaction data mainly includes interaction data such as likes and comments of the user on media content recommendation information of another user. The user may have joined a plurality of circles. In this case, the interaction data of the user includes interaction data such as likes and comments of the user on recommendation information of another user in each of the circles joined by the circle. The interaction data of the user reflects activeness of the user.

2) Receive a notification message sent by the media content server after the media content server sets, according to the interaction data, the user to be a user having the circle owner permission.

The interaction data of the user reflects the activeness of the user, and the level of the user is determined according to the interaction data of the user. Each level has specific requirements, for example, requirements on quantities of likes and comments. When the quantities of likes and comments in the interaction data of the user reach a requirement of a specific level, the user reaches this level. The media content server 102 sets a circle owner permission for a user reaching a specific level. The user having the circle owner permission can establish a circle and manage the established circle. This mainly includes selecting a headline recommendation for the circle, removing a user from the circle, forbidding a user in the circle to post. The forbidding a user in the circle to post means that the user is not allowed to interact with another user in the circle. This mainly includes that user is not allowed to like or comment, nor is allowed to recommend media content in the circle, that is, cannot provide media content recommendation information.

In some instances, the user having the circle owner permission can establish a circle. This mainly includes the following steps.

1) Establish a circle establishment option.

Still using the film recommendation as an example, a user logs in to a video APP account to establish a new circle. As shown in FIG. 3, the user clicks a me option 304, so that a page in FIG. 8 is shown. The page in FIG. 8 displays an avatar and a name of the current user, as well as a film added to favorites of the current user, a circle joined by the current user, a circle established by the current user, and a circle establishment option. When the user clicks the circle establishment option 801, a circle name input box 802, a circle tag input box 803 and an establishment option 804 are presented. After entering a name and a tag of a to-be-established circle, the user clicks the establishment option 804 to send a circle establishment request to the media content server.

2) In response to selection of the circle establishment option by the user having the circle owner permission on, send a circle establishment request carrying an identifier and a tag of a new circle to the media content server.

As described in the foregoing instance, after the user clicks the establishment option 804, the client of the user sends the circle establishment request to the media content server. The request carries the identifier and the tag of the to-be-established circle that are entered by the user.

3) Receive an acknowledgment message sent after the media content server establishes the new circle.

The media content server establishes the new circle according to the name and the tag of the to-be-established circle carried in the circle establishment request, and sends the acknowledgment message to the client of the user. In addition, the identifier of the new circle established by the user is presented in an established circle option 805 in FIG. 8. When the user clicks the established circle option 805, identifiers of all circles established by the user are presented.

In some instances, the user having the circle owner permission manages the circle established by the user mainly includes the following steps.

1) When the user has a circle owner permission, present a user management option of a circle established by the user.

Still using the video recommendation as an example, on the interface in FIG. 8, when the user clicks the established circle option 805, the client presents identifiers of all circles established by the user. When the user clicks an identifier of a circle, a circle interface in FIG. 9 is presented. Identifiers of all users in the circle are shown on the interface. The identifier of each user mainly includes an avatar and a name of the user. In addition, management options such as a deletion option 901, a banned to post option 902, and a modification option 903 are presented. The deletion option 901 is used for removing a selected user identifier from the circle. The banned to post option 902 is used for forbidding a user corresponding to the selected user identifier to like, comment or recommend a video in the circle. The modification option 903 may be used for, for example, modifying an alias of a user.

2) In response to selection of the management option by the user, send a management request carrying the identifier of the circle and an identifier of at least one user in the circle to the media content server.

When the user selects identifiers of one or more users as well as the deletion option 901, the banned to post option 902, or the modification option 903, the client sends a corresponding management request to the media content server. The management request carries the identifier of the circle and the to-be-processed identifiers of the one or more users.

3) Receive an acknowledgment message sent by the media content server after the media content server performs a management operation corresponding to the management request on the one or more users corresponding to the identifiers of the one or more users in the circle corresponding to the identifier of the circle.

The media content server performs, according to the management request, an operation corresponding to the deletion option 901, the banned to post option 902, or the modification option 903 on the one or more users corresponding to the identifiers of the one or more users in the circle corresponding to the identifier of the circle in the management request, and sends an acknowledgment message to the client.

In some instances, the user having the circle owner permission can determine headline recommendation in the circle established by the user mainly includes the following steps:

1) When the user has a circle owner permission, present a headline recommendation option of a circle established by the user.

When the user determines a headline recommendation of the circle established by the user, for example, determines video recommendation, a headline recommendation option 904 is presented on an interface of the circle established by the user in FIG. 9. The user clicks the headline recommendation option 904 to present all optional film identifiers, and selects a film identifier and uses a film corresponding to the film identifier as a film of the headline recommendation.

2) In response to selection of the user on the headline recommendation option, determine headline media content recommendation information of the circle, and send the headline media content recommendation information to the media content server.

The client determines, according to the film identifier selected by the user, media content recommendation information corresponding to the film identifier, and sends the media content recommendation information to the media content server 102.

The method further includes:

3) After the access request is sent in step 1003, the client receives the headline media content recommendation information sent by the media content server and presents the headline media content recommendation information at a specified position on a page.

After receiving the headline recommendation information, the media content server 102 determines the circle corresponding to the identifier of the circle in the recommendation information, and sends the recommendation information to the client of each user in the determined circle for presentation. The recommendation information may be a poster of the selected film. The client may present the poster at a top position on the posted page in FIG. 4.

Figure 11:
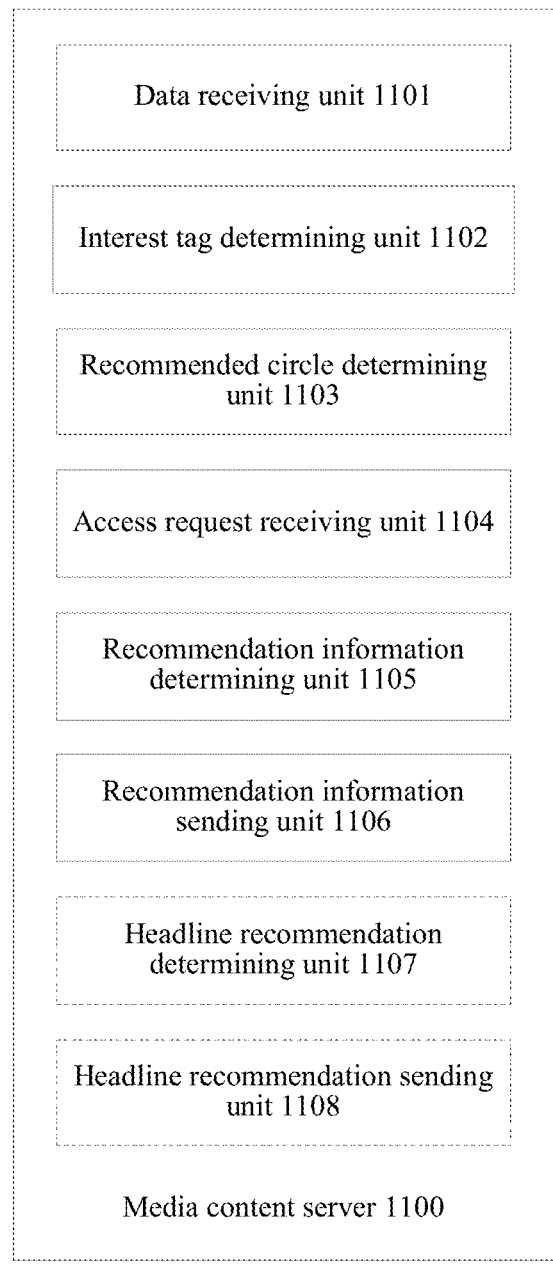
FIG. 11 is a schematic structural diagram of a media content server according to one embodiment of this application.

This application further provides a media content server 1100. As shown in FIG. 11, the server mainly includes:

a data receiving unit 1101, configured to receive historical data of access to media content by a user and/or media content data followed by the user;

an interest tag determining unit 1102, configured to determine an interest tag of the user according to the historical data and/or the followed media content data;

a recommended circle determining unit 1103, configured to: determine a recommended circle for the user according to the interest tag, and send an identifier of the recommended circle to a client of the user for presentation;

an access request receiving unit 1104, configured to receive an access request that carries the identifier of the recommended circle and that is sent by the client;

a recommendation information determining unit 1105, configured to determine, according to the identifier of the recommended circle, media content recommendation information provided by each user in the recommended circle; and a recommendation information sending unit 1106, configured to push, to the client, the media content recommendation information provided by each user in the recommended circle.

According to the media content server provided in this application, the interest tag of the user is determined according to the media content data accessed by the user and media content data followed by the user, to recommend the circle matching the interest tag of the user to the user, so that the user can view the media content information recommended by the users in the recommended circle. This helps the user find the media content in which the user is interested. In addition, it is easier for a media content provider to find a target user group, thereby improving a media content recommendation effect.

In some instances, the recommended circle determining unit 1103 is configured to: determine a circle set matching the interest tag of the user; determine a recommendation rating of each circle in the circle set; sort the circles according to the recommendation ratings; and use, according to a sorting result, one or more circles whose positions in the sequence satisfy a preset condition as recommended circles of the user.

In some instances, the recommendation information sending unit 1106 is configured to: sort the media content recommendation information provided by each user according to recommendation time points; and send the media content recommendation information provided by each user and a sorting sequence of the recommendation time points of the media content recommendation information to the client of the user, so that the client presents the media content recommendation information provided by each user according to the sorting sequence.

In some instances, the recommendation information sending unit 1106 is configured to perform the following steps on media content recommendation information provided by a user in the recommended circle, which further includes obtaining a level of the user, a recommendation time point of the media content recommendation information and/or a quantity of favorable comments made by another user in the recommended circle on the media content recommendation information; and determining a score of the media content recommendation information according to the level of the user, the recommendation time point of the media content recommendation information and/or the quantity of favorable comments made by the another user in the recommended circle on the media content recommendation information; sorting the media content recommendation information provided by each user in the recommended circle according to the scores of the media content recommendation information; and sending a sorting result to the client, so that the client presents the media content recommendation information according to the sorting result.

In some instances, the server further includes: a headline recommendation determining unit 1107, configured to determine headline media content recommendation information of the recommended circle; and a headline recommendation sending unit 1108, configured to send the headline media content recommendation information to a client of each user in the recommended circle, so that each client presents the headline media content recommendation information at a specified position on a page.

Figure 12:
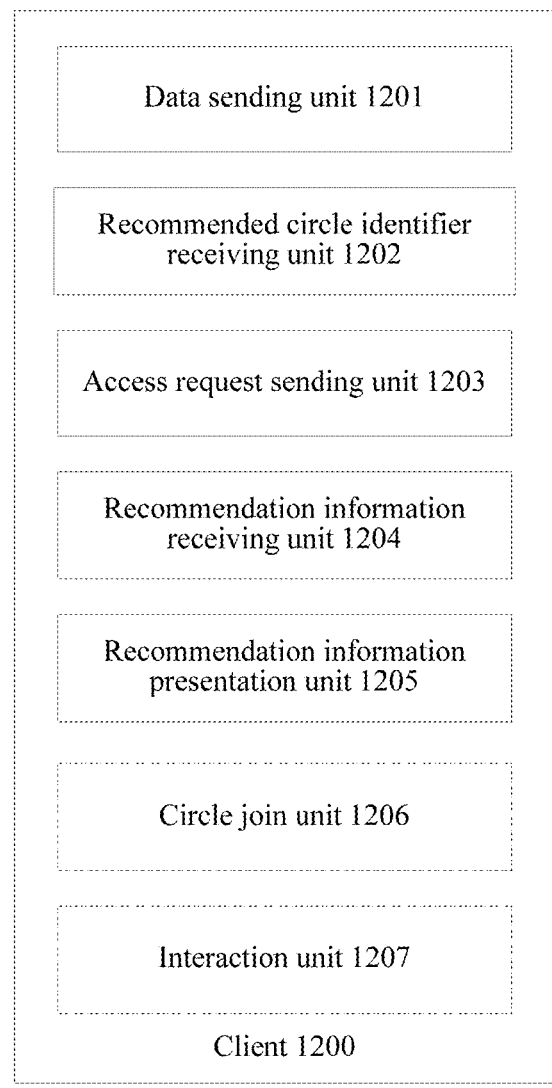
FIG. 12 is a schematic structural diagram of a client according to one embodiment of this application.

This application further provides a client 1200. As shown in FIG. 12, the client mainly includes: a data sending unit 1201, configured to send, to a media content server, historical data of access to media content by a user and/or media content data followed by the user, so that the media content server determines a recommended circle for the user; a recommended circle identifier receiving unit 1202, configured to receive and present an identifier of the recommended circle sent by the media content server; an access request sending unit 1203, configured to send, in response to an operation on the presented identifier of the recommended circle, an access request carrying the identifier of the recommended circle to the media content server; a recommendation information receiving unit 1204, configured to receive media content recommendation information pushed by the media content server and provided by each user in the recommended user group corresponding to the identifier of the recommended circle; and a recommendation information presentation unit 1205, configured to present the received media content recommendation information.

According to the client provided in this application, an interest tag of the user is determined according to the media content data accessed by the user and media content data followed by the user, to recommend the circle matching the interest tag of the user to the user, so that the user can view the media content information recommended by the users in the recommended circle. This helps the user find the media content in which the user is interested. In addition, it is easier for a media content provider to find a target user group, thereby improving a media content recommendation effect.

In some instances, the client further includes a circle join unit 1206, configured to: in response to an operation on a presented identifier of one of recommended user groups, present a posted page of the recommended user group, a user group join option being presented on the posted page; in response to an operation on the user group join option, send a user group join request carrying an identifier of the user and the identifier of the recommended user group; and receive an acknowledgment message sent by the media content server, the media content server sending the acknowledgment message after adding the identifier of the user to the recommended user group corresponding to the identifier of the recommended user group.

In some instances, the recommendation information presentation unit 1205 is configured to further present an interaction option corresponding to each media content recommendation information when presenting the media content recommendation information. The client further includes an interaction unit 1207, configured to: in response to an operation on an interaction option of any media content recommendation information, send an interaction request carrying an identifier and interaction content of the media content recommendation information to the media content server, the interaction content including the identifier of the user and an identifier of an interaction type.

In some instances, the interaction unit 1207 is further configured to: receive input text content and add the text content to the interaction content.

In some instances, the interaction unit 1207 is further configured to: receive interaction content, sent by the media content server, of one of the media content recommendation information provided by each user; and display the interaction content at a position of the media content recommendation information on a posted page of the recommended user group.

When the user selects the identifier of the circle in which the user joins, to access the circle, the interaction unit 1207 receives the identifier and the interaction content of the media content recommendation information that are sent by the media content server, and displays the interaction content at a position of the media content recommendation information corresponding to the identifier of the media content recommendation information.

This application further provides a non-volatile computer readable storage medium, storing a machine readable instruction, the machine readable instruction being executable by a processor to implement the foregoing method.

Figure 13:
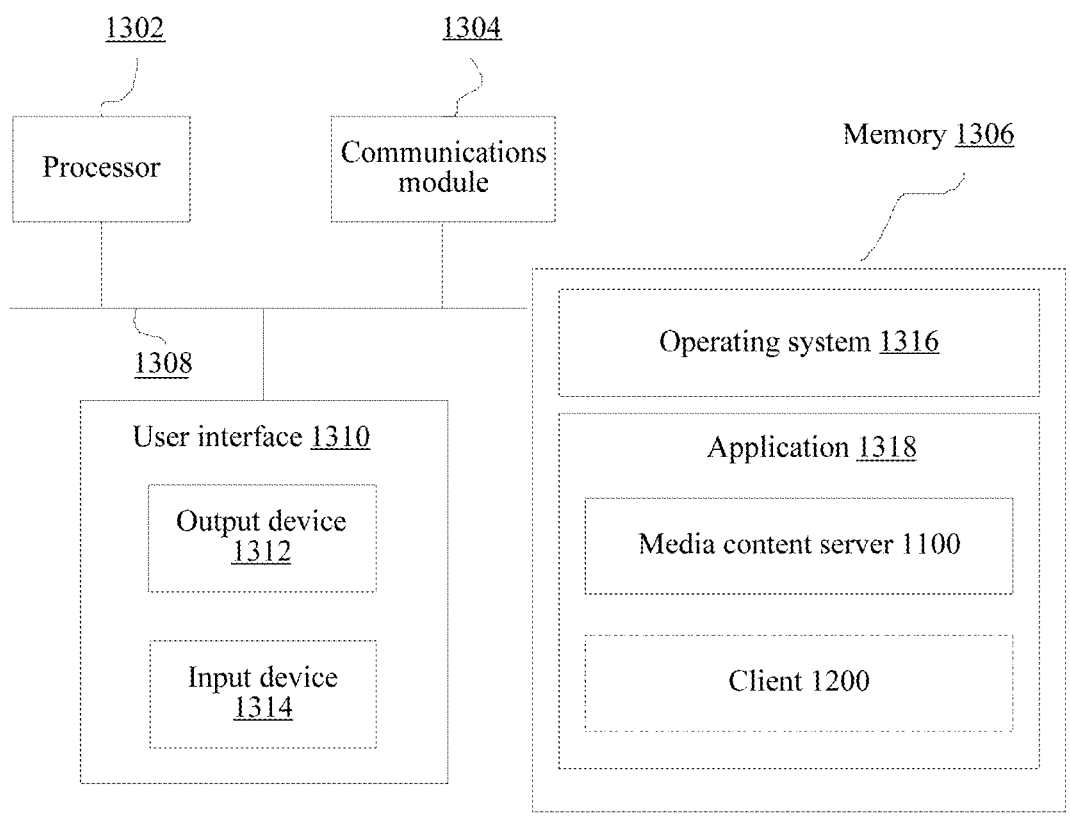
FIG. 13 is a schematic structural diagram of a computing device according to one embodiment of this application.

FIG. 13 is a structural diagram of a computing device in which the media content server 1100 and the client 1200 are located. As shown in FIG. 11, the computing device includes one or more processors (CPUs) 1302, a communications module 1304, a memory 1306, a user interface 1310, and a communications bus 1308 configured to connect the components.

The processor 1302 may receive and send data by using the communications module 1304 to implement network communication and/or local communication.

The user interface 1310 includes one or more output devices 1312 that include one or more speakers and/or one or more visual displays. The user interface 1310 further includes one or more input devices 1314 that include, for example, a keyboard, a mouse, a voice command, an input unit or a microphone, a touchscreen display, a touch-sensitive tablet, a posture capture camera, or other input buttons or controls.

The memory 1306 may be a high speed random-access memory such as a dynamic random-access memory (DRAM), a static random-access memory (SRAM), a double data rate random-access memory (DDR RAM), or another random access solid-state storage device; or a non-volatile memory such as one or more disk storage devices, an optical disk storage device, a flash memory, or another non-volatile solid-state storage device.

The memory 1306 stores an instruction set that can be executed by the processor 1302 and includes: an operating system 1316, including a program used for processing various basic system services and for performing a hardware related task; and an application 1318, including various application programs used for media content recommendation, where such application programs are capable of implementing processing procedures in the foregoing instances and may, for example, include some or all units in the media content server 1100 or some or all units in the client 1200. At least one of the units in the media content server 1100 and the client 1200 may store a machine executable instruction. The processor 1302 can implement, by executing the machine executable instruction in at least one of units in the memory 1306, a function of the at least one modules of the units.

It should be noted that, not all steps and modules in the foregoing procedures and structural diagrams are necessary, and some steps or modules may be omitted according to actual needs. An execution sequence of the steps is not fixed, and may be adjusted according to needs. Division of the modules is merely functional division for ease of description. During actual implementation, one module may be implemented separately by a plurality of modules, and functions of a plurality of modules may also be implemented by one same module. The modules may be located in a same device, and may also be located in different devices.

The hardware module in the embodiments may be implemented by using hardware or a hardware platform together with software. The software includes a machine readable instruction stored in a non-volatile storage medium. Therefore, the embodiments may also be presented as a software product.

In the instances, the hardware may be implemented by using dedicated hardware or hardware executing a machine readable instruction. For example, the hardware may be a specifically designed permanent circuit or logical device (for example, a dedicated processor, such as a field programmable gate array (FPGA) or an application-specific integrated circuit (ASIC)) for implementing a specific operation. The hardware may also include a programmable logical device or circuit (for example, including a general processor or another programmable processor) configured temporarily by software and configured to execute a specific operation.

In addition, each instance of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such a storage medium also constitutes this application. This application further provides a non-volatile storage medium. The non-volatile storage medium stores a data processing program. The data processing program can be used for performing any of the foregoing method instances in this application.

The machine readable instruction corresponding to the modules in FIG. 13 can enable an operating system operated on a computer and the like to implement some or all of the operations described herein. The non-volatile computer readable storage medium may be a memory inserted into an expansion board in a computer or a memory written to an expansion unit connected to a computer. A CPU or the like installed on the expansion board or the expansion unit may perform some or all actual operations according to an instruction.

In the several embodiments provided in the present application, it should be understood that the disclosed system, apparatus, and method may be implemented in other manners. For example, the described apparatus embodiments are merely exemplary. For example, a module, a sub-module, a unit, and a sub-unit may be merely logical function division and may be other division in actual implementation. For example, a plurality of modules or sub-modules or components may be combined or integrated into another system, or some features may be ignored or not performed.

The modules/units described as separate parts may or may not be physically separate, and the parts displayed as modules/units may or may not be physical modules/units, may be located in one position, or may be distributed on a plurality of modules or units. Some of or all of the modules or units may be selected according to actual needs to achieve the objectives of the solutions of the embodiments.

In addition, functional modules and units in the embodiments of the present disclosure may be integrated into one processing unit, or each of the units may exist alone physically, or two or more units may be integrated into one unit. The integrated units may be implemented in a form of hardware or may be implemented in a form of a software functional unit.

If implemented in the form of software functional modules and units and sold or used as an independent product, the integrated modules/units may be stored in a computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, a network device, or the like) to perform all or a part of steps of the methods described in the embodiments of the corresponding modules or units. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely exemplary embodiments of the present disclosure, but are not intended to limit the embodiments of the present disclosure. Any modification, equivalent replacement, or improvement made without departing from the spirit and principle of the embodiments of the present disclosure shall fall within the protection scope of the embodiments of the present disclosure.

What is claimed is:

1. A media content recommendation method, applied to a media content server and comprising:
   receiving historical data of access to media content by a user or media content data followed by the user;
   determining an interest tag of the user according to the historical data or the followed media content data;
   determining a recommended user group for the user according to the interest tag, comprising:
     determining a user group set matching the interest tag of the user;
     determining a recommendation rating of each user group in the user group set;
     sorting the user groups according to the recommendation ratings; and using, according to the sorted user groups, one or more user groups in a sequence satisfying a condition as the recommended user group of the user;

sending an identifier of the recommended user group to a client for presentation;

receiving an access request that carries the identifier of the recommended user group and that is sent by the client;

determining, according to the identifier of the recommended user group, media content recommendation information provided by each user in the recommended user group; and pushing, to the client, the media content recommendation information provided by each user in the recommended user group.

2. The method according to claim 1, wherein there are M recommended user groups, M being an integer greater than 1; and the sending an identifier of the recommended user group to a client for presentation comprises:

sending identifiers of the M recommended user groups and a sorting sequence of recommendation ratings of the M recommended user groups to the client, the client presenting the identifiers of the M recommended user groups according to the sorting sequence.

3. The method according to claim 1, wherein the pushing, to the client, the media content recommendation information provided by each user in the recommended user group comprises:

for media content recommendation information provided by a user in the recommended user group, obtaining a level of the user, a recommendation time point of the media content recommendation information or a quantity of favorable comments made by another user in the recommended user group on the media content recommendation information; and determining a score of the media content recommendation information according to the level of the user, the recommendation time point of the media content recommendation information or the quantity of favorable comments made by the another user in the recommended user group on the media content recommendation information;

sorting the media content recommendation information provided by each user in the recommended user group according to the scores of the media content recommendation information, to obtain a sorting result; and sending the sorting result to the client, the client presenting the media content recommendation information according to the sorting result.

4. The method according to claim 1, further comprising:

determining headline media content recommendation information of the recommended user group; and sending the headline media content recommendation information to a client of each user in the recommended user group, each client presenting the headline media content recommendation information on a page of the recommended user group.

5. The method according to claim 1, further comprising:

receiving a user group join request sent by the client and carrying an identifier of the user and the identifier of the recommended user group; and adding the identifier of the user to the recommended user group in response to the user group join request.

6. The method according to claim 5, further comprising:

receiving an interaction request sent by the client for one of the media content recommendation information provided by each user in the recommended user group, the interaction request comprising an identifier and interaction content of the media content recommendation information, and sending the interaction content and the identifier of the media content recommendation information to a client of each user in the user group, each client presenting the interaction content at a position of the media content recommendation information.

7. The method according to claim 1, further comprising:

obtaining interaction data of the user from the client;

determining a level of the user according to the interaction data; and when the level satisfies a first condition, setting the user as a user having a circle owner permission.

8. The method according to claim 7, further comprising:

receiving a user group establishment request from the client, the user group establishment request carrying an identifier and a tag of a new user group; and establishing the new user group according to the identifier and the tag of the new user group.

9. The method according to claim 7, further comprising:

receiving a management request from the client, the management request carrying an identifier of a user group and to-be-processed identifiers of one or more users; and managing the identifiers of the one or more users in the user group corresponding to the identifier of the user group according to the management request.

10. The method according to claim 7, further comprising:

receiving headline media content recommendation information from the client, the headline media content recommendation information carrying an identifier of a user group; and sending the headline media content recommendation information to a client of each user in the user group corresponding to the identifier of the user group, each client presenting the headline media content recommendation information on a page of the user group.

11. A media content server, comprising a processor and a memory connected to the processor, the processor being configured to:

receive historical data of access to media content by a user or media content data followed by the user;

determine an interest tag of the user according to the historical data or the followed media content data;

determine a recommended user group for the user according to the interest tag, comprising:

determining a user group set matching the interest tag of the user;

determining a recommendation rating of each user group in the user group set;

sorting the user groups according to the recommendation ratings; and using, according to the sorted user groups, one or more user groups in a sequence satisfying a condition as the recommended user group of the user;

send an identifier of the recommended user group to a client for presentation;

receive an access request that carries the identifier of the recommended user group and that is sent by the client;

determine, according to the identifier of the recommended user group, media content recommendation information provided by each user in the recommended user group; and push, to the client, the media content recommendation information provided by each user in the recommended user group.

12. The server according to claim 11, wherein there are M recommended user groups, M being an integer greater than 1; and
the processor is further configured to:
send identifiers of the M recommended user groups and a sorting sequence of recommendation ratings of the M recommended user groups to the client, the client presenting the identifiers of the M recommended user groups according to the sorting sequence.

13. The server according to claim 11, wherein the processor is further configured to:
for media content recommendation information provided by a user in the recommended user group, obtain a level of the user, a recommendation time point of the media content recommendation information or a quantity of favorable comments made by another user in the recommended user group on the media content recommendation information; and determine a score of the media content recommendation information according to the level of the user, the recommendation time point of the media content recommendation information or the quantity of favorable comments made by the another user in the recommended user group on the media content recommendation information;
sort the media content recommendation information provided by each user in the recommended user group according to the scores of the media content recommendation information, to obtain a sorting result; and
send the sorting result to the client, the client presenting the media content recommendation information according to the sorting result.

14. The server according to claim 11, wherein the processor is further configured to:
determine headline media content recommendation information of the recommended user group; and
send the headline media content recommendation information to a client of each user in the recommended user group, each client presenting the headline media content recommendation information on a page of the recommended user group.

15. The server according to claim 11, wherein the processor is further configured to:
receive a user group join request sent by the client and carrying an identifier of the user and the identifier of the recommended user group; and
add the identifier of the user to the recommended user group in response to the user group join request.

16. The server according to claim 15, wherein the processor is further configured to:
receive an interaction request sent by the client for one of the media content recommendation information provided by each user in the recommended user group, the interaction request comprising an identifier and interaction content of the media content recommendation information; and
send the interaction content and the identifier of the media content recommendation information to a client of each user in the user group, each client presenting the interaction content at a position of the media content recommendation information.

17. The server according to claim 11, wherein the processor is further configured to:
obtain interaction data of the user from the client;
determine a level of the user according to the interaction data; and
when the level satisfies a first condition, set the user as a user having a circle owner permission.

18. The server according to claim 17, wherein the processor is further configured to:
receive a user group establishment request from the client, the user group establishment request carrying an identifier and a tag of a new user group; and
establish the new user group according to the identifier and the tag of the new user group.

19. The server according to claim 17, wherein the processor is further configured to:
receive a management request from the client, the management request carrying an identifier of a user group and to-be-processed identifiers of one or more users; and
manage the identifiers of the one or more users in the user group corresponding to the identifier of the user group according to the management request.

20. A non-transitory computer readable storage medium, storing computer readable instructions, to cause at least one processor to perform:
receiving historical data of access to media content by a user or media content data followed by the user;
determining an interest tag of the user according to the historical data or the followed media content data;
determining a recommended user group for the user according to the interest tag, comprising:
determining a user group set matching the interest tag of the user;
determining a recommendation rating of each user group in the user group set;
sorting the user groups according to the recommendation ratings; and
using, according to the sorted user groups, one or more user groups in a sequence satisfying a condition as the recommended user group of the user;
sending an identifier of the recommended user group to a client for presentation;
receiving an access request that carries the identifier of the recommended user group and that is sent by the client;
determining, according to the identifier of the recommended user group, media content recommendation information provided by each user in the recommended user group; and
pushing, to the client, the media content recommendation information provided by each user in the recommended user group.

* * * * *